June 16, 1964  F. S. DOMKA  3,137,188
SELF-CLEANING CUTTING DIE WITH STRIPPER
ELEMENTS SEPARABLE FROM CUTTING DIE
Filed Oct. 23, 1961

INVENTOR.
FRANK S. DOMKA
BY
WILSON, SETTLE & CRAIG
ATTORNEYS

United States Patent Office 3,137,188
Patented June 16, 1964

3,137,188
SELF-CLEANING CUTTING DIE WITH STRIPPER ELEMENTS SEPARABLE FROM CUTTING DIE
Frank S. Domka, 26814 Kean St., Inkster, Mich.
Filed Oct. 23, 1961, Ser. No. 146,749
1 Claim. (Cl. 83—124)

This invention relates to cutters for sheet materials, and more particularly to a self-cleaning cutting die for cutting holes in or circles from sheet stock such as gasket materials, paper stock, sheet cork, sheet plastics and the like.

In the prior art, it has been a common practice in cutting parts from sheet stock such as fiber board, gasket materials and the like, to utilize a hollow die with an ejector therein in the form of a chunk of rubber, to remove the slug or cut-out that was forced into the interior of the die during the cutting operation on the sheet stock. However, this type of die-ejector combination is characterized by the disadvantage that the slug or cut-out is ejected directly back into the hole in the sheet from which it was cut as the die is lifted away from the sheet following the cutting operation. In view of the fact that the slug is forced back into the sheet from which it was cut, a hand picking operation has been required to remove the slugs from the sheet in order to provide a finished product, that being either the slug of particular configuration or the configured sheet.

It will be obvious that this hand picking operation contributes substantially to the cost of die cut items, which of necessity must be produced in the most economical manner for competitive reasons.

Another type of die that has heretofore been used has included a hollow interior and as the slugs are cut from the sheet stock, they are permitted to remain in the hollow interior and the next slug forces the first slug upwardly through the die, this process being repeated until the slugs are ejected from the top of the die. However, this type of cutting die has been able to accommodate only certain types of stock and has been characterized in many instances by jamming of the slugs within the interior of the die, requiring downtime for maintenance and often resulting in a rupture of the die body. Additionally, these units have been of substantially expensive manufacture because of the necessary open back plate or platen configuration and guide tubes and other associated apparatus.

Where punches of the hollow variety have heretofore been used that contain no ejecting mechanism and thus retain the slug after the cutting operation, provision had to be made for removal of the slug from the punch. This is usually done manually and, as previously discussed the manual labor has contributed substantially to the cost of the cut items.

Accordingly, if an improved self-cleaning cutting die could be provided that would eject the cut-out portion or slug from the die after the die was lifted from the sheet, and thus deposit the cut-out on top of the sheet to fall freely therefrom to avoid either a hand picking of the sheet or a hand cleaning of the die, a substantial step forward in the art of self-cleaning cutting dies would be provided.

It is therefore an important object of the present invention to provide a novel self-cleaning cutting die.

A further object is to provide a novel self-cleaning cutting die that ejects the cut slug from its interior automatically a brief instant after the die is removed from the cut stock so that the slug is ejected on top of the stock rather than back into the hole from which it was cut.

A further object of the present invention is to provide a self-cleaning cutting die of simplified construction and containing but three basic parts, coordinated so that two of the parts move relative to the third part to provide an improved self-cleaning action.

A further object is to provide a self-cleaning cutting die which is of improved simplicity of construction, is more inexpensive to manufacture than prior art devices, is sturdy and of rugged construction and is entirely self-contained and self-cleaning, ejecting the slug on top of the stock a brief interval after the die is removed from the stock following the cutting operation.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

BRIEF PERSPECTIVE

Briefly, the present invention relates to a self-cleaning cutting die for cutting holes in or parts from sheet stock materials such as fibrous gasket materials, paper stock and the like, characterized in that a hollow cutter serves as a mount or guide for a unique inner ejector connected with a unique outer stock follower or stirpper surrounding the exterior of the cutter and controlling the movement of the ejector to provide self-cleaning of the cut slug from the interior of the die, its action being delayed so that the cut out is ejected from the die only after the die has been completely elevated above the sheet acted upon.

In accordance with the present invention by the utilization of the novel inner ejector and outer stock follower or stripper, there is no practical lower limit beyond which the die of the present invention cannot be made; thus, the present structure is adapted to cutting holes as small as 1/16 inch or even smaller as contrasted to the impossibility of building the structures of the prior art to provide the same type of ejection.

THE INVENTION

The Cutter

Figure 1:
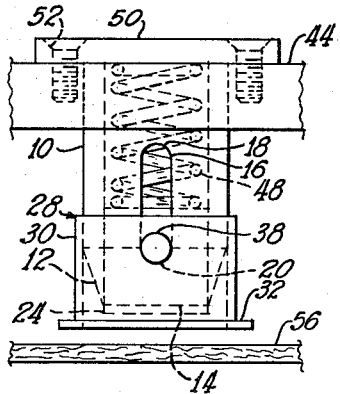
FIGURE 1 is an elevational view with interior parts shown in dotted outline of the improved self-cleaning cutting die of the present invention.
Figure 2:
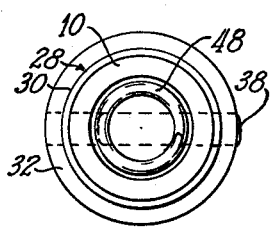
FIGURE 2 is a top plan view of the self-cleaning cutting die of FIGURE 1, omitting the supporting platen and backing plate.

As shown in the drawings, the self-cleaning cutting die of the present invention comprises as one of its components a tubular cutter 10 having an exterior bevel 12 formed on its lower end that tapers to a cutting edge 14. As best shown in FIGURE 1, an elongated axially extending slot 16 having semi-circular ends 18 and 20 is formed on one side of the tubular cutter 10 and, as shown in FIGURES 3, 4 and 5 of the drawings a circular hole 22 is formed opposite the slot 16 for a purpose to be hereinafter described.

The Ejector and Stripper

Figure 3:
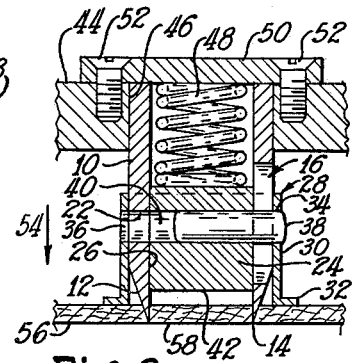
FIGURE 3 is a longitudinal sectional view of the improved die of the present invention illustrating the device in the position of severing a portion from a sheet of material.
Figure 4:
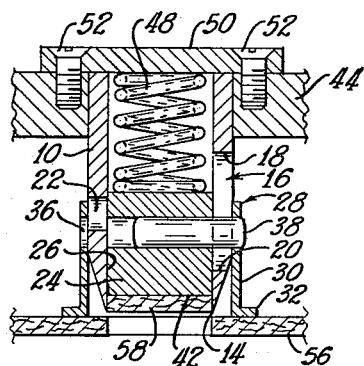
FIGURE 4 is a section view similar to FIGURE 3 illustrating withdrawal of the die and the cut slug from the stock and illustrating the position of parts at the moment when the ejector contacts the slug to begin the self-cleaning action.
Figure 5:
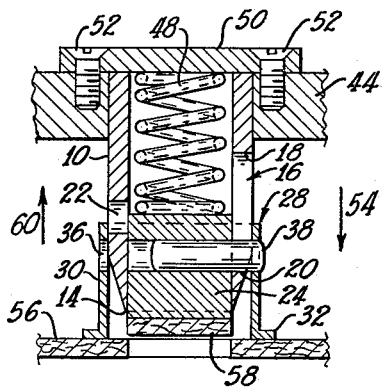
FIGURE 5 is a sectional view similar to FIGURE 4, but illustrating the further withdrawal of the die from the stock at the exact moment of completion of the slug ejection step.

As best shown in FIGURES 3, 4 and 5, a cylindrical ejector 24 is positioned within the interior bore 26 of the tubular cutter 10 and has an outside diameter providing a free sliding fit. On the outside of the tubular cutter, there is provided a control sleeve or stripper 28 for actuating the cylindrical ejector 24 and stripping the sheet from the outside of the cutter 10. The control sleeve or stripper 28 includes a tubular wall 30 having a radially outwardly extending foot or stock engaging annulus 32. Near the upper edge of the tubular wall 30 of the control sleeve 28 there are provided diametrically opposed circular holes 34 and 36 and a cylindrical control or connector pin 38 is passed through the hole 34 and into a cylindrical bore 40 formed adjacent the top end of the ejector 24 and extending diametrically therethrough. As noted in FIGURES 3, 4 and 5, one end of the pin 38 is retained substantially flush with the outside surface of the tubular wall 30 of the control sleeve 28 and the other end terminates about medially of the cylindrical ejector 24. This provides a connection between the ejector 24 and the stripper sleeve 28 whereby these units move together in a unitary manner.

When necessary, as for repair or maintenance such as sharpening the cutting edge 14, the pin 38 can be knocked out of the cylindrical bore 40 and the hole 34 by alignment of the hole 36 of the stripper sleeve 28 with the hole 22 of the tubular cutter 10. With the pin 38 removed the ejector 24 will be released from the sleeve 28 for disassembly of the mechanism.

As regards the illustration of FIGURES 3, 4 and 5, it will be noted that it is an important aspect of the invention that the bottom end 42 of the ejector 24 forms an ejector or slug engaging portion that is spaced approximately the thickness of the stock to be cut away from the annulus 32 of the stripper sleeve 28. As will be described later, this spaces the ejector above the stock during cutting and provides the novel self-cleaning cutting action and ejection function provided by the present invention.

Before proceeding with the description of the operation of the present invention, it will also be noted that the unit is suitably mounted for operation on a platen represented by the numeral 44 of a suitable cutting press, the platen 44 being provided with a hole 46 to receive the exterior surface of the tubular cutter as a press fit. One suitable method of mounting the cutter of the present invention comprises pressing the tubular cutter 10 into the hole 46 of the platen 44 and then inserting a spring 48 within the interior bore 26 of the tubular cutter 10 behind or on top of the cylindrical ejector 24. Thereafter, a back up plate 50 suitably made of cold rolled sheet steel or other similar material is fastened in compressing relationship above the spring 48 as by means of screws or bolts 52.

As regards this detail of mounting, it is also to be included within the scope of the invention that the platen 44 may be substantially thicker than shown and that the hole 46 can be counterbored so that the lower edge of the platen 44 extends downwardly over the unit substantially to the radially outwardly extending foot or annulus 32 in its most retracted position. This method of mounting provides a more concealed type of operation, yet still permits the control sleeve 28 to be freely operable, the counterbored hole being sufficiently larger than the exterior of the control sleeve 28 to assure freedom of movement.

Operation of the Present Invention

As shown in FIGURE 3, the platen 44 has been brought downwardly in the arrow 54 direction until the cutting edge 14 has penetrated completely through the thickness of the sheet stock material 56. As previously mentioned, the bottom end 42 of the ejector 24 is spaced rearwardly of the annulus 32. Thus, as the cutting edge 14 moves downwardly through the stock, the foot 32 contacts the top of the stock and forces the pin 38 and the ejector 24 upwardly so that the bottom edge 42 is retained in non-contacting relation above the top surface of the stock at the time the cut is made.

As shown in FIGURE 4, the tubular cutter 10 has been retracted from the stock to a point where the cutting edge 14 is just above the top surface of the stock. It will be noted that the spring 48 has forced the ejector 24 downwardly relative to the tubular cutter 10, maintaining the radially outwardly extending foot 32 on top of the stock and the bottom surface 42 of the ejector 24 is now in contacting relationship with the top of the slug 58 that has been removed from the sheet stock 56 because of its friction or press fit within the interior bore 26 of the tubular cutter 10. At this point the slug has been lifted free of the stock and the self-cleaning action and delayed ejection is about to take place.

As shown in FIGURE 5, the tubular cutter has been removed still further away from the upper surface of stock 56 and the slug 58 has just been completely ejected past the cutting edge 14 to fall free as the cutter 10 will continue to move away from the stock in the arrow 60 direction. It will be noted that the spring 48 has continued to expand and force the cylindrical ejector 24 downwardly in the arrow 54 direction maintaining the radially outwardly extending annulus or foot 32 in contact with the upper surface of the stock 56 until the pin 38 has now reached the bottom end 20 of the elongated slot 16. At this point, the slug 58 is beginning to drop away as the cutter 10 continues its movement away from the stock in the arrow 60 direction so that the slug will be dropped gently and loosely on top of the stock.

As regards the entire prior description, it is to be noted that one form of cutting press utilized for the cutting of sheet materials is analogous to a printing press wherein the stock is brought forward on a movable carrier to engage the cutters that are mounted on a vertically disposed platen 44. In the cutting position, the stock 56 assumes a generally vertical position. Therefore, as shown in FIGURE 5, when the cutter 10 is being retracted and the slug 58 is just at its fully ejected position, it will fall vertically downwardly out of the machine adjacent and along the top surface of the stock 56 and the stock will be automatically cleaned as will the die.

Figure 6:
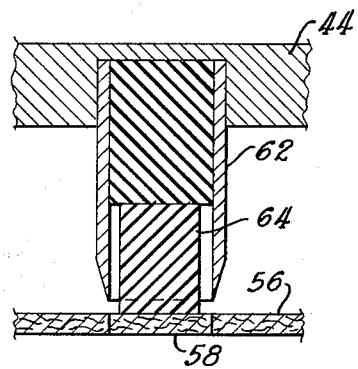
FIGURE 6 is a section view of a prior art device illustrating ejection of a cut slug back into the aperture of the mother material from which it was cut.

This is contrasted to the operation of the prior art devices, now commonly used and as shown in FIGURE 6 wherein a simple tubular cutter 62 is utilized by being mounted in a platen 44. However, in the prior art structure, the interior of the tubular cutter 62 is provided with a cylindrical rubber slug 64 that comprises the ejector. As shown in FIGURE 6, it will be be noted that the slug 58 has been jammed back into the hole from which it was cut to remain in the stock 56. Thus, when the cutting operation is completed according to the prior art, it will be necessary to hand pick the slug 58 from the cut stock 56.

Extended Scope of Invention

In describing one specific embodiment of the present invention, a spring 48 has been shown for the purpose of pushing the cylindrical ejector 24 and the stripper 28 downwardly to provide the self-cleaning and delayed ejection function of the present invention. However, it is to be included within the scope of the invention that the spring 48 can be a resilient biasing member in general and thus, a rubber slug could be substituted for the spring. Such operation has been utilized with great success.

Materials of construction utilized in the present invention include hardenable steel for the hollow die 10 so that the cutting edge 14 can withstand severe punishment in cutting tough fibrous materials such as paper, cardboard, fiber board, sheet plastics, etc. The ejector and stripper can be made of metal and also they can be fabricated of plastics, wood and other reasonably durable materials because they are not required to withstand the force to which the cutter is subjected.

Although the improved self-cleaning cutting die of the present invention has been illustrated and described as being in the form of a generally tubular mechanism for cutting round holes in stock, or in making circular shapes it is to be included within the scope of the invention to extend the three element concept of cutting square, triangular, hexagonal and other shapes as by utilizing an appropriate cutter of hollow configuration and of either triangular or other cross sectional wall with the ejector being contoured to a sliding fit within the wall and with the control sleeve being contoured to fit the exterior of the wall. Thus, the cutter of the invention can be fabricated into substantially any desired shape.

Also, although only one cutting die has been illustrated in the drawing, it is to be included within the scope of the invention to mount a plurality of the units on a platen of a cutting machine to provide appropriate aperture patterns in stock to be fabricated or to provide simultaneous production of different cut out shapes.

Although the invention has been described as showing the cutting bevel on the outside of the tubular cutter 10, it is to be included within the scope of the invention to place the cutting bevel to the inside inasmuch as the upper portion of the ejector 24 will provide a guide surface and proper alignment of the parts with respect to each other for a free moving action without jamming.

While a solid cylindrical ejector has been shown in the drawings, it is to be included within the broad scope of the invention to fabricate this element as a tube, a cup with a disc-like bottom, or a hollow cylinder with disc-like top and bottom.

Also, the slot 16 in the wall of the cutter 10 can be of oval or other configuration as long as it holds the ejector and stripper within appropriate vertical limits. Thus, at least some rotational movement of the stripper and ejector relative to the cutter can be tolerated.

In some instances, as when the stock is tough, the annulus 32 can be omitted to provide still further reduction in cost of the present unit. Thus stock tubing could be used in some instances for the stripper.

Advantages of the Present Invention

From the foregoing it will be noted that an improved cutting die of improved simplicity over prior constructions is provided in accordance with the present invention. Thus, the principal components of the present invention are three; including a hollow cutter and an ejector positioned therein that cooperates through a connecting pin to an outer control or stripper sleeve. In this regard, an important feature of the present invention stems from the use of the simple slug ejector riding inside of the tubular cutter. Thus, this unit can be made extremely small, as for example to the size of the lead of a pencil or smaller thus providing for the cutting of holes no greater than 1/16 of an inch in diameter; and in very delicate work, and with careful machining, the cutter could be made much smaller for providing even finer cuts for still smaller cut outs. In the prior art devices which have utilized much more complicated ejector mechanisms, these simply could not be made to these extremely small sizes and thus, the present mechanism has provided a substantial advance in the art of self-cleaning cutting dies.

A further advantage that is inherent in the structure of the present invention relies in its delayed ejecting action so that the slug cut from the stock is not ejected back into the stock and thus hand picking operations as encountered in the prior art are dispensed with to provide more economical manufacturing operations.

Also, an important aspect of the present invention resides in the self-cleaning action of the cutting die and this connected with the fact that the cleaning does not cause the slug to be ejected back into the mother material provides still a further advantage for the present improved structure.

I claim:

In a self-cleaning cutting die, a platen, a tubular body having a wall and a cutting edge at one end thereof secured to the platen, an elongated slot in said wall and extending lengthwise of said body and terminating in spaced relation from said cutting edge, a solid cylindrical ejector having an outside diameter slightly less than the inside diameter of said tubular body positioned in slidable relation within said tubular body, a cylindrical passage extending diametrically through said solid cylindrical ejector, a tubular stripper positioned in slidable relation over the outside of said tubular body, diametrically opposed circular holes in said stripper, a cylindrical pin extending in press fitted relation through one of said holes of said stripper in slidable relation through said slot, and in press fitted relation part way through said cylindrical passage of said ejector, a circular opening in said wall of said tubular body in diametrically opposed relation to said slot for enabling said pin to be removed from said cylindrical passage and said one hole in said stripper upon alignment of said holes with said opening whereby said ejector and said stripper are released from said tubular body to expose said cutting edge, a stock engaging annulus formed on the end of said stripper adjacent said cutting edge, said ejector having a knock-out surface facing outwardly past said cutting edge, and said knock-out surface being spaced rearwardly within said tubular body in relation to said annulus, and spring means interposed between the ejector and the platen to induce relative movement between the cutting edge of the tubular body and the ejector after the cutting edge has been moved to clear the upper surface of the material being cut.

References Cited in the file of this patent

UNITED STATES PATENTS

| 22,873 | Howard et al. | Feb. 8, 1859 |
| 1,814,824 | Candenbach | July 14, 1931 |
| 2,191,836 | Stromberg | Feb. 27, 1940 |

FOREIGN PATENTS

| 29,531 | Austria | Aug. 10, 1907 |